United States Patent

Lane

[11] 3,938,830
[45] Feb. 17, 1976

[54] TOW BAR ASSEMBLY

[76] Inventor: Oscar B. Lane, 1030-3rd Ave. S., Nashville, Tenn. 37210

[22] Filed: Oct. 16, 1974

[21] Appl. No.: 515,163

[52] U.S. Cl. .............................. 280/493; 280/491 R
[51] Int. Cl.² ........................................ B60D 1/16
[58] Field of Search ........... 280/491 D, 491 E, 502, 280/491 R, 493

[56] References Cited
UNITED STATES PATENTS

| | | | |
|---|---|---|---|
| 2,139,970 | 12/1938 | Moore | 280/491 D |
| 3,083,040 | 3/1963 | Hayman et al. | 280/493 |
| 3,281,162 | 10/1966 | Carson | 280/493 X |
| 3,716,255 | 2/1973 | Morris | 280/491 E |
| 3,806,162 | 4/1974 | Milner | 280/502 |

*Primary Examiner*—M. Henson Wood, Jr.
*Assistant Examiner*—R. Schrecengost
*Attorney, Agent, or Firm*—Harrington A. Lackey

[57] ABSTRACT

A tow bar assembly including a pair of draft bars, attachment members for the bumper of a towed vehicle, universally coupled to the trailing ends of the tow bars, and a towing vehicle coupling member pivotally joined to the leading ends of the tow bars, to permit pivotal adjustable movement of the draft bars in a substantially horizontal plane.

2 Claims, 5 Drawing Figures

U.S. Patent  Feb. 17, 1976  3,938,830
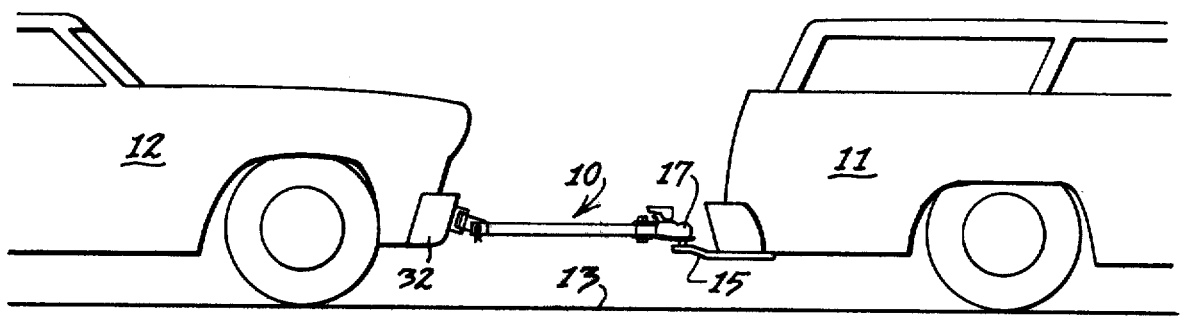
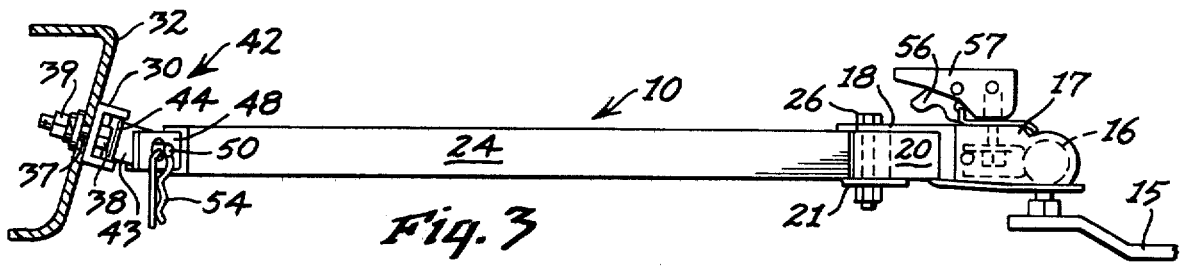
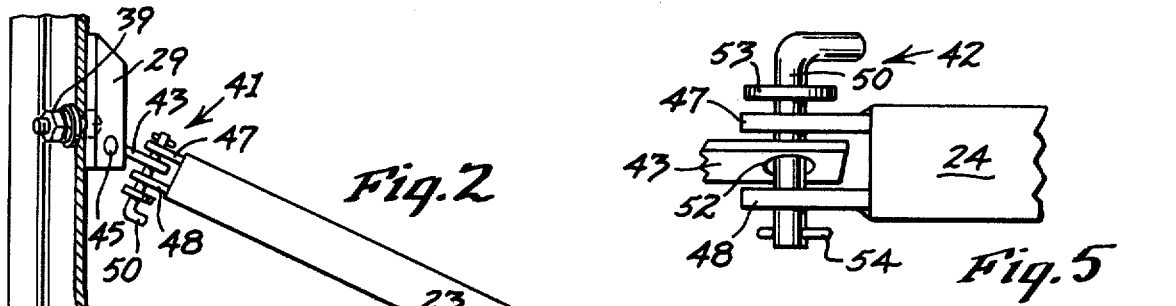
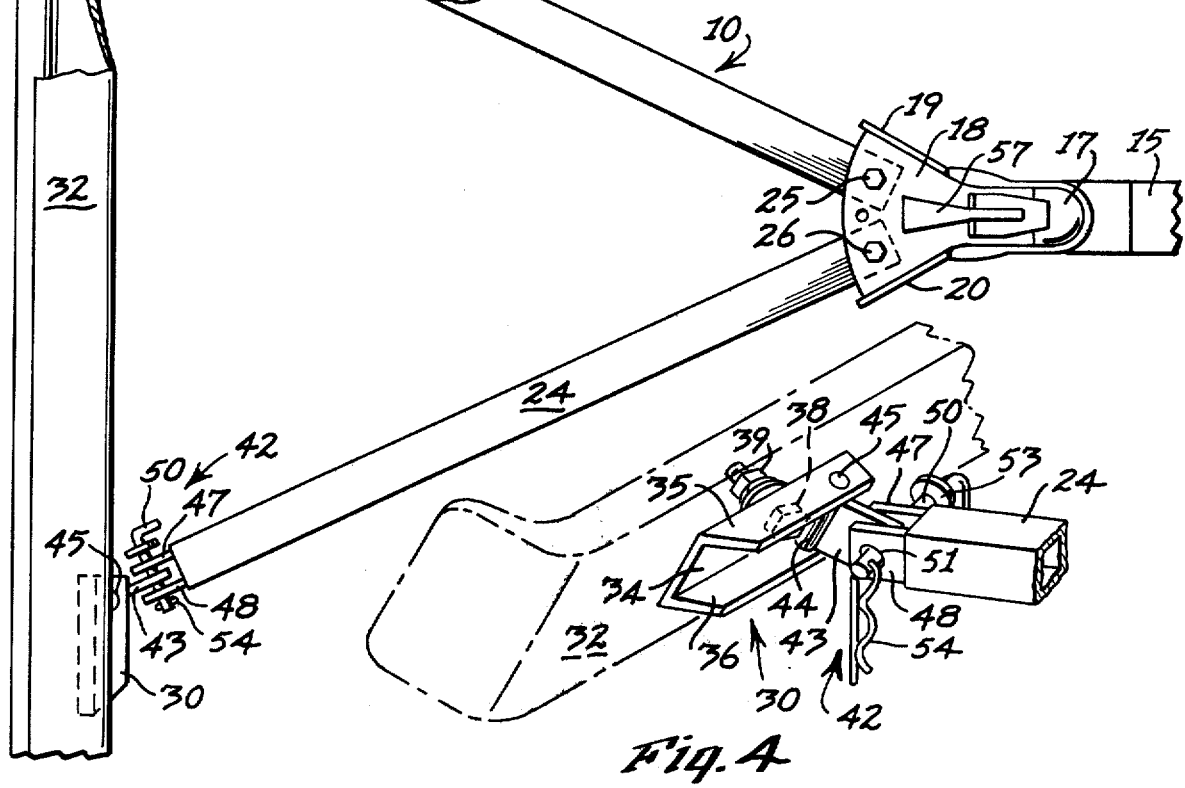

TOW BAR ASSEMBLY

BACKGROUND OF THE INVENTION

This invention relates to a tow bar, and more particularly to a tow bar assembly having a pair of adjustable draft bars.

Heretofore, most trailer vehicles have been towed behind towing vehicles, such as automobiles, by conventional "ball hitches," in which the ball connector is fixed to the rear end of the towing vehicle and the ball receptor is attached to the tongue of the trailing vehicle.

Tow bars including single draft bars for towing trailing vehicles are also known in the art.

SUMMARY OF THE INVENTION

It is an object of this invention to provide a tow bar assembly including a hitch member, such as a ball receptor of conventional construction, for coupling with a mating hitch member, such as a ball hitch member, on the rear end of a towing vehicle. One of the hitch members is pivotally connected to a pair of draft bars which are free to be swung for adjustment in a substantially horizontal plane. Each of the opposite ends of the draft bars are connected by a substantially universal coupling member to an attachment member for detachable connection to laterally spaced points along the front end of a trailing vehicle.

Such a tow bar assembly facilitates attachment of a towing vehicle, such as an automobile or pick-up truck, to the front end of a trailing vehicle, such as another automobile, having a front bumper of one of various designs or contours.

Moreover, the tow bar assembly made in accordance with this invention includes various pivotal and journal connections which compensate, not only for the differences in the vertical angles between the towing and trailing vehicles as they move over hills and valleys, but also for the relative turning movement between the towing and trailing vehicles.

BRIEF DESCRIPTION OF THE DRAWINGS

FIG. 1 is a side elevation of the tow bar assembly in operative position connecting a trailing vehicle to a towing vehicle, fragmentarily shown;

FIG. 2 is an enlarged top plan view of the tow bar assembly in operative position, with the trailing vehicle bumper shown fragmentarily and the hitch tongue of the towing vehicle disclosed fragmentarily;

FIG. 3 is a side elevation of the tow bar assembly disclosed in FIG. 2;

FIG. 4 is an enlarged perspective view of one of the bumper attachment members coupled to the trialing end of a draft bar, shown fragmentarily; and FIG. 5 is an enlarged fragmentary view of the trailing end of a draft bar disclosing the tongue of the coupling member in an angular position.

DESCRIPTION OF THE PREFERRED EMBODIMENT

Referring now to the drawings in more detail, FIG. 1 discloses the tow bar assembly 10 made in accordance with this invention, and in operative position connecting a towing vehicle, such as an automobile or station wagon 11 and a trailing vehicle 12, such as another automobile, adapted to be pulled over a roadway 13.

As disclosed in FIG. 3, the hitch tongue 15 of the towing vehicle 11 is provided with a ball hitch member 16. Accordingly, the front end portion of the tow bar assembly 10 is provided with a ball receptor hitch member 17, of a conventional construction, adapted to cooperate and couple with ball hitch member 16.

The ball receptor hitch member 17 is mounted upon a hitch plate 18 having depending side walls 19 and 20. The hitch plate 18 is adapted to be disposed in a substantially horizontal position when the ball receptor hitch member 17 is locked to the ball hitch member 16 in operative position, as disclosed in FIGS. 1, 2 and 3.

As disclosed in FIG. 2, the hitch plate 18 is fan-shaped with the depending side walls 19 and 20 diverging rearward. The bottom edges of the side walls 19 and 20 are fixed to, and bridged by, a bottom strap 21 (FIG. 3).

Received between the hitch plate 18 and bottom strap 21, and also between the diverging side walls 19 and 20, are the leading or front ends of a pair of elongated draft bars 23 and 24. The leading ends of the draft bars 23 and 24 are journaled between the hitch plate 18 and the bottom strap 21 by a pair of pivot pins 25 and 26, so that the front ends of the draft bars 23 and 24 are slightly spaced from each other and also spaced from their adjacent side walls 19 and 20, to permit pivotal adjustable movement in a substantially horizontal plane. The swinging adjustable movement of each draft bar 23 and 24 is limited inward by the position of the other draft bar, and outward by engagement with the corresponding side wall 19 and 20.

The trailing or rear end of each draft bar 23 and 24 is connected to a corresponding attachment member 29 and 30, each of which is preferably of identical construction, one being the mirror image of the other. Each attachment member 29 and 30 is adapted to be fixed, preferably detachably, to laterally spaced apart front portions of the trailing vehicle 12.

As illustrated in the drawings, each attachment member 29 and 30 is preferably in the form of a bumper shoe of short length adapted to fit flush against laterally spaced apart rear surfaces of a bumper 32 fixed to the front end of the trailing vehicle 12. Although the attachment members 29 and 30 are described as being laterally spaced apart, they are spaced apart longitudinally of the bumper 32.

Each bumper shoe is specifically disclosed in the form of a short length of a channel member having a web portion 34 and flange portions 35 and 36 (FIG. 4). The web portion 34 is aligned longitudinally of the bumper 32 and provided with a hole therethrough, not specifically disclosed, for registry with a hole 37 in the bumper 32 (FIG. 3). Extending through the hole in the web portion 34 and the hole 37 is a bolt member 38 with its headed end against the web 34 and its threaded end projecting behind the bumper 32 and secured thereon by a nut 39. The hole 37 may be an existing hole in a bumper 32 supporting a bumper guard. Thus, to assemble the tow bar assembly 10 upon a bumper 32 having a bumper guard, the bumper guard is merely removed, exposing the hole 37 for reception of the bolt member 38.

Each attachment member 29 and 30 is joined to the trailing end of the corresponding draft bar 23 and 24 by a universal-type coupling members 41 and 42. Each universal-type coupling member 41 and 42 includes a tongue member or tongue plate 43 having its rear portion 44 in the form of a sleeve for receiving a journal pin 45 projecting through the journal sleeve 44 and both flange portions 35 and 36 of the bumper shoe 29 and 30, as best disclosed in FIG. 4. Thus, the tongue 43 is journaled to the attachment member 30, or 29, for free pivotal movement about the axis of the journal pin 45. The axis of the journal pin may be substantially vertical, depending upon the shape of the bumper 32, and therefore the attitude of the bumper shoe 29 or 30.

The front end portion of the tongue member 43 projects between a pair of laterally spaced ears 47 and 48 projecting rearward from the trailing or rear portion of each draft bar 23 and 24. A pivot pin 50 extends through apertures 51 in ears 47 and 48 and registering aperture 52 in tongue member 43 to permit free relative pivotal movement between the tongue member 43 and the ears 47 and 48. The pivot pin 50 has a collar 53 at one end and a locking clip 54 at the opposite end extending through a hole in the pin 50.

Under normal road conditions, the relative pivotal movement between the tongue member 43 and the ears 47 and 48 would be in a vertical pivotal plane.

As best disclosed in FIGS. 2 and 5, the ears 47 and 48 are spaced apart laterally a distance substantially greater than the thickness of the tongue member 43, to permit play for lateral shifting of the tongue member 43 between the ears 47 and 48 in the axial direction of the pivot pin 50. Also, the hole 52 in the tongue 43 receiving the pivot pin 50 is substantially larger than the diameter of the pivot pin 50 to permit canting or a diagonal attitude of the tongue 43 relative to the ears 47 and 48, as best disclosed in FIG. 5.

Thus, the coupling members 41 and 42 permit relative motions of multiple types between each of the respective draft bars 23 and 24 and their respective bumper shoes 29 and 30.

In mounting the tow bar assembly 10 upon the front bumper 32 of a trailing vehicle 12, draft bars 23 and 24 may be pivoted in a horizontal plane about their respective pivot pins 25 and 26 relative to the hitch plate 18. Thus, the draft bars 23 and 24 may be spread apart or moved together so that the bumper shoes 29 and 30 may occupy the most desirable or the optimum positions upon the bumper 32 for purposes of seating and connection to the bumper 32. Moreover, the spreading apart of the draft bars 23 and 24 permits a certain structural stability to the two bar assembly 10.

The pivotal axes about the journal pins 45 and 50 permit better seating between each attachment member 29 and 30 and its respective portion of the bumper 32. For example, as disclosed in FIGS. 3 and 4, the front surface of bumper 32 is angled downward and rearward. Accordingly, the pivot pin 50 permits the shoes 29 and 30 to be pivoted upward so that the web portion 34 fits flush against the front surface of the bumper 32 for attachment. The journal pin 45 also permits the flush attachment of the attachment members 29 and 30 to the surface of the bumper 32, regardless of the angular dispositions of the draft bars 23 and 24, as best disclosed in FIG. 2.

Furthermore, with the tow bar assembly 10 in operative position and the towing vehicle 11 towing the trailing vehicle 12 over a road surface 13 including bumps, hills and valleys, the bumper shoes 29 and 30 are free to swing in substantially vertical planes about the respective pins 50 without applying undue stress either to the bumper shoes 29 and 30 or to the respective tow bars 23 and 24.

In turning movements of the vehicles 11 and 12, as well as during momentary, but frequent, vibration and jostling, such as when only one side of the trailing vehicle 12 encounters a bump, the journal pins 45, the spacing between the ears 47 and 48 and the tongue 43, and the enlarged hole 52 in the tongue 43, permit corresponding movements, without undue stress, between the attachment members 29 and 30 and the corresponding draft bars 23 and 24.

In removing the two bar assembly 10 from the vehicles 11 and 12, either end of the tow bar assembly 10 may be disconnected from its respective vehicle, or both ends may be removed. If the tow bar assembly 10 remains upon the trailing vehicle 12, it is readily removed from the towing vehicle 11 by actuating the conventional latch means 56 and locking handle 57 to disconnect the ball receptor hitch 17 from the ball hitch 16. Because of the hinge axes of the pivot pins 50, the receptor 17 may merely be lowered to, and rest upon, the ground or roadway 13, until the towing vehicle 11 is recoupled, or another towing vehicle is substituted.

To remove the rear end of the tow bar assembly 10 from the bumper 32, the nuts 39 are merely unthreaded, while the bolts 38 are removed from their respective holes 37 in the bumper 32.

When both ends of the tow bar assembly 10 are removed from their respective vehicles 11 and 12, the draft bars 23 and 24 are swung together about their respective pivot pins 25 and 26 to minimize the space which they occupy, for transportation or storage.

What is claimed is:

1. A tow bar assembly adapted to be attached to the front portion of a trailing vehicle, for towing by a towing vehicle having a draft hitch member, comprising:
   a. a cooperative hitch member adapted to detachably couple with said draft hitch member in operative position,
   b. a pair of elongated draft bars having leading and trailing end portions,
   c. means pivotally connecting each of said leading end portions to said cooperative hitch member to permit pivotal movement of said draft bars in a substantially horizontal plane when said hitch members are coupled in operative position,
   d. an attachment member for each draft bar, each of said attachment members having means for detachable connection to a trailing vehicle,
   e. coupling means connecting the trailing end portion of each draft bar to a corresponding attachment member,
   f. each of said coupling means comprising a pair of laterally spaced ears projecting rearward from each of said trailing end portions,
   g. said coupling means further comprising a tongue projecting forward from said corresponding attachment member between said ears, and a transverse pin connecting said ears and said tongue for relative pivotal movement about the longitudinal axis of said pin,
   h. the spacing between said ears being greater than the dimension of said tongue in the same direction as said ear spacing, to permit translatory shifting movement of said tongue between said ears.

2. The invention according to claim 1 in which said tongue has a hole receiving said transverse pin therethrough, said hole being substantially larger than the cross-section of said transverse pin.

\* \* \* \* \*